US009908181B2

(12) United States Patent
Samoilov et al.

(10) Patent No.: US 9,908,181 B2
(45) Date of Patent: Mar. 6, 2018

(54) SELF-CENTERING COMPACT FLOATING REAMER HOLDER

(71) Applicant: Iscar Ltd., Tefen (IL)

(72) Inventors: Evgeny Samoilov, Kiryat Bialik (IL); Michael Altman, Kfar Tavor (IL)

(73) Assignee: Iscar, Ltd., Tefen (IL)

( * ) Notice: Subject to any disclaimer, the term of this patent is extended or adjusted under 35 U.S.C. 154(b) by 88 days.

(21) Appl. No.: 14/804,889

(22) Filed: Jul. 21, 2015

(65) Prior Publication Data

US 2017/0021430 A1    Jan. 26, 2017

(51) Int. Cl.
| | |
|---|---|
| *B23B 31/08* | (2006.01) |
| *B23B 51/12* | (2006.01) |
| *B23D 77/00* | (2006.01) |
| *B23B 31/00* | (2006.01) |

(52) U.S. Cl.
CPC ............. *B23B 31/08* (2013.01); *B23D 77/00* (2013.01); *B23B 31/008* (2013.01); *B23B 51/12* (2013.01); *B23B 2231/22* (2013.01); *B23D 2277/42* (2013.01); *Y10T 279/17017* (2015.01); *Y10T 279/25* (2015.01)

(58) Field of Classification Search
CPC ..... B23B 31/008; B23B 31/08; B23B 31/083; B23B 2231/22; B23B 51/12; Y10T 279/17017; Y10T 279/25; B23D 77/00; B23D 2277/42

See application file for complete search history.

(56) References Cited

U.S. PATENT DOCUMENTS

| | | | |
|---|---|---|---|
| 1,359,103 | A | 11/1920 | Randa |
| 1,566,553 | A | 12/1925 | Maisch |
| 2,429,564 | A | 9/1945 | Petersen |
| 2,475,385 | A | 7/1949 | Frisco |
| 2,475,386 | A | 7/1949 | Frisco |
| 2,547,522 | A | 4/1951 | Eichelman |
| 2,634,985 | A * | 4/1953 | Groen .................. B23B 31/008 279/103 |

(Continued)

FOREIGN PATENT DOCUMENTS

JP    S51 126497 U    10/1976

OTHER PUBLICATIONS

International Search Report dated Nov. 7, 2016, issued in PCT counterpart application (No. PCT/IL2016/050695).

(Continued)

*Primary Examiner* — Eric A Gates
*Assistant Examiner* — Chwen-Wei Su
(74) *Attorney, Agent, or Firm* — Womble Bond Dickinson (US) LLP

(57) ABSTRACT

A compact oldham-type floating reamer holder with holder and reamer portions which transfer torque therebetween via a floating member. The floating reamer holder includes an elastic element which axially biases the holder and reamer portions. In an operative position, the floating reamer holder is configured to automatically enable angular misalignment, parallel misalignment and axial translation between the holder and reamer portion axes. In a non-operative position, the reamer portion axis is co-aligned with the holder portion axis. And the elastic element at least partially overlaps the reamer portion.

21 Claims, 5 Drawing Sheets

(56) References Cited

U.S. PATENT DOCUMENTS

| | | | | |
|---|---|---|---|---|
| 2,778,647 A | * | 1/1957 | Benjamin | B23B 31/08 |
| | | | | 279/16 |
| 2,810,584 A | * | 10/1957 | Slotta | B23B 31/08 |
| | | | | 279/6 |
| 2,848,239 A | | 8/1958 | Benjamin et al. | |
| 4,111,442 A | * | 9/1978 | Wawrzyniak | B23B 31/08 |
| | | | | 279/16 |
| 4,269,421 A | | 5/1981 | Wawrzyniak | |
| 4,984,942 A | * | 1/1991 | Holtz | B23B 31/08 |
| | | | | 279/16 |

OTHER PUBLICATIONS

Written Opinion dated Nov. 7, 2016, issued in PCT counterpart application (No. PCT/IL2016/050695).

* cited by examiner

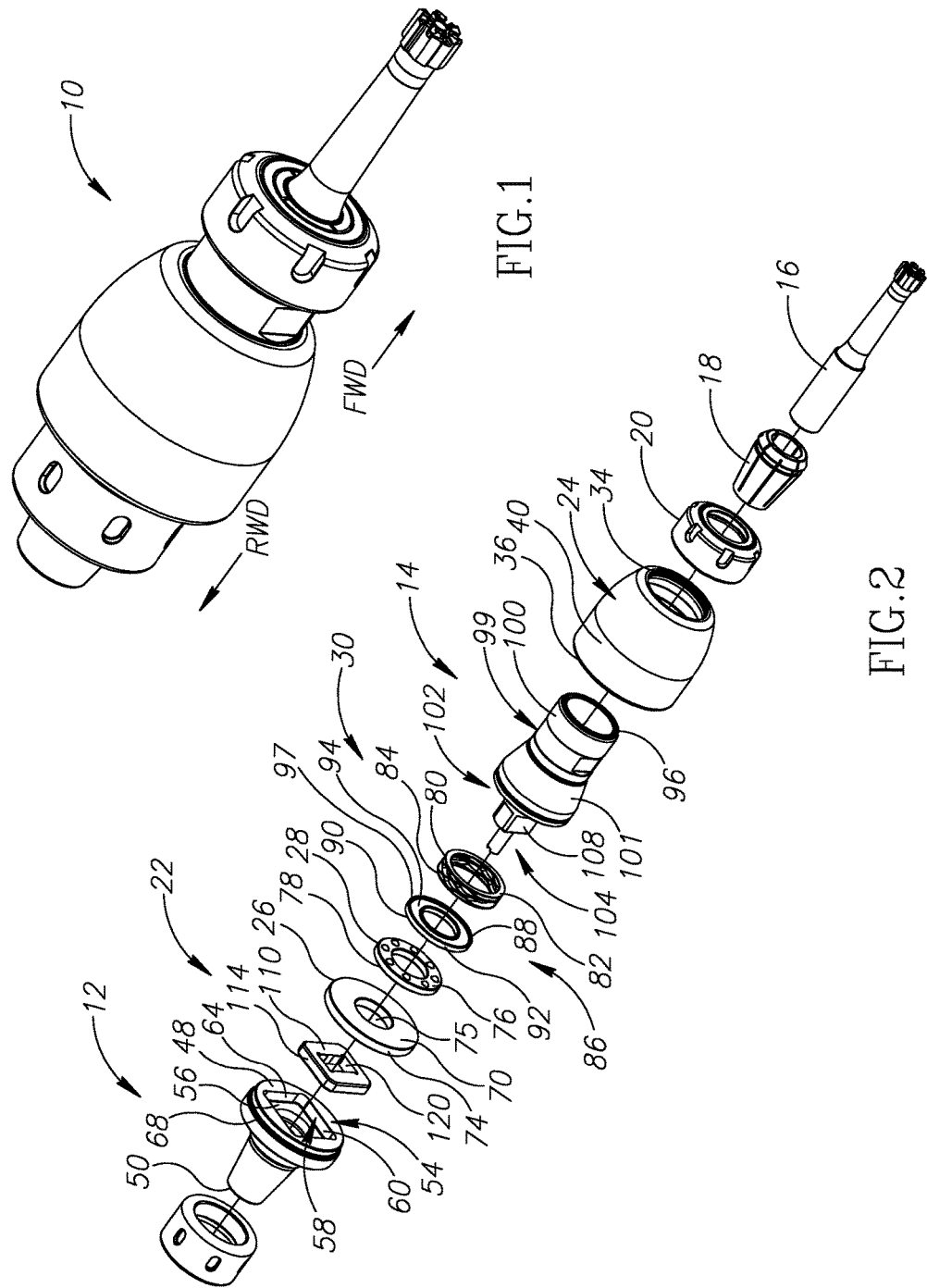

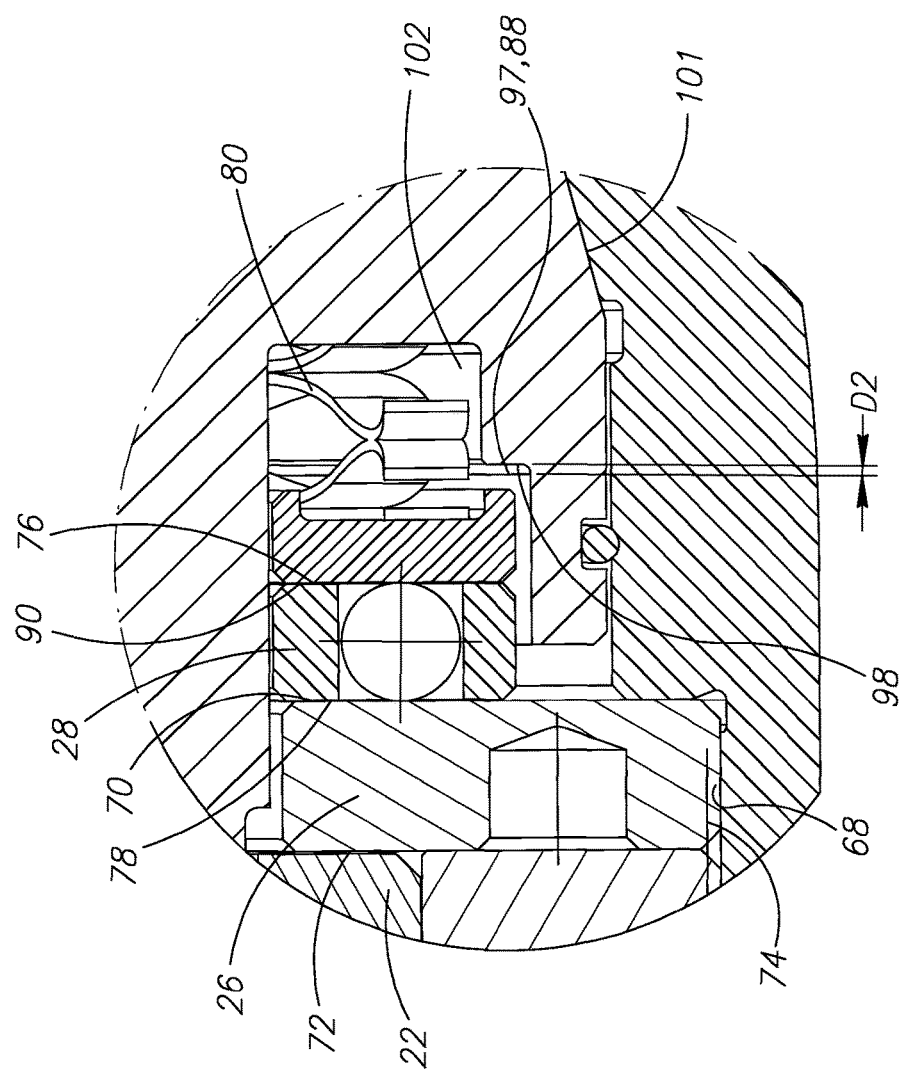

SELF-CENTERING COMPACT FLOATING REAMER HOLDER

FIELD OF THE INVENTION

The subject matter of the present application relates to floating, or Oldham-type, reamer holders, and more particularly self-centering floating reamer holders.

BACKGROUND OF THE INVENTION

Reamers are precision tools for machining existing, or pre-drilled, holes to improve surface quality while, consequently, slightly enlarging the hole. Due to the nature of the precision machining which reamers are designed to carry out, even slight misalignment between the hole and reamer during insertion of the reamer can result in damage to the reamer cutting edges and/or the hole.

Consequently holders called 'floating reamer holders' are utilized for holding the reamer. A floating reamer holder is configured to allow, during hole entry, and during reaming, axial misalignment of a reamer axis with respect to the hole axis which, consequently, means that the floating holder reamer enables slight misalignment between the reamer itself (replaceable tool), and the machine that holds and it.

One major disadvantage in tools of the field is that this floating holder reamer adds to the overall overhang, or projection, of the tool from the machine. This can lead to larger bending moment in turning applications due to the tool+holder larger weight.

Some floating reamer holders of the field disclose rather complicated designs with many parts and specifically pins or multiple peripheral protrusions. This has a negative effect on the floating reamer holder's axial length, and obviously on production costs, which usually are directly affected by the number of parts and accurate surfaces that need to be ground.

Floating reamer holders of the field are disclosed, e.g., in U.S. Pat. No. 1,359,103, which discloses a compact, old-ham-style floating reamer holder, with holder and reamer portions which transfer torque therebetween via a flat floating member. The floating member is divided into two halves by a virtual plane (in the axial direction). Each half is located in respective female recesses in each of the holder and reamer portions. This "in-line" engagement arrangement between the floating member and the holder and reamer portions exposes the floating member to great shear forces (most transferred torque becomes shear forces applied at said virtual plane), which can lead to wear and early breakage on one hand, and on the other hand, limits machining speeds/productivity.

U.S. Pat. No. 1,566,553 discloses an adjustable floating reamer holder, which enables three types of freedom of movement. However, this arrangement does not provide automatic (i.e., without interference from an operator), accurate centering in a non-operative state. Specifically for enabling angular misalignment, this arrangement includes a ball and coiled spring which are also supposed to center the driven member 20 in a non-operative position (the ball enters centering depressions in the driven and driving members 20, 13). However, the coiled spring alone (abutting the rear end 17 of the driven member 20) only centers the rear end of the driven member 20, leaving the forward end 21 loose and non-centered if the nut 42 is not manually tightened. Therefore, this floating reamer holder would require a recalibration of the driving member with each reamer replacement. Furthermore, the cooperating radial driving lugs/tongues 14 and diametrical slot 9, are exposed to shear forces, resulting from the transferred torque.

SUMMARY OF THE INVENTION

In accordance with a first aspect of the subject matter of the present application there is provided a compact oldham-type floating reamer holder having forward and rear directions and comprising:
  a holder portion having a central holder portion axis;
  a reamer portion having a reamer portion axis;
  a floating member transferring a torque between the holder portion and the reamer portion; and
  an annular elastic element at least partially overlapping the reamer portion in the axial direction and biasing the reamer portion in the axially forward direction,
  wherein
  in an operative position, the floating reamer holder is configured to accommodate an angular misalignment, a parallel misalignment and an axial translation between the holder and reamer portion axes; and
  in a non-operative position, the reamer portion axis is accurately co-aligned with the holder portion axis.

In accordance with a second aspect of the subject matter of the present application there is further provided the self-centering floating reamer holder comprising:
  the elongated holder portion having a central holder portion axis;
  the elongated reamer portion located forward of the holder portion, the reamer portion comprising:
    axially opposite reamer portion front and rear surfaces; and
    an external reamer portion centering surface which tapers towards the reamer portion front surface, in the forward direction;
  a housing sleeve rigidly and releasably connected to the holder portion, the housing sleeve having a tapering sleeve first centering surface;
  an annular elastic element axially forcing the reamer portion centering surface against the tapering sleeve first centering surface, in the forward direction; and
  the floating member located within the housing sleeve and transferring torque between the holder portion and the reamer portion.

Any of the following features, either alone or in combination, may be applicable to any of the above aspects of the subject matter of the application:

The floating reamer holder comprises a housing sleeve rigidly and releasably connected to the holder portion, and the reamer portion and the housing sleeve have respective, cooperating sleeve first centering surface and reamer portion centering surface which taper in a forward axial direction from the holder portion towards the reamer portion.

Both the sleeve first centering surface and the reamer portion centering surface can have a frustoconical shape.

The reamer portion has a single central protrusion which at least partially axially overlaps the holder portion from within.

The holder portion has a member recess and the floating member is entirely located within the member recess.

The protrusion is located within a through floating member hole.

The floating member has member inner slide surfaces and the protrusion comprises opposite and parallel protrusion slide surfaces which engage the floating member inner slide surfaces.

The floating member has floating member outer slide surfaces;

the holder portion has a member recess provided with opposite and parallel recess slide surfaces, the recess slide surfaces being transverse to the floating member inner slide surfaces and parallel to the floating member outer slide surfaces; and the holder portion's recess slide surfaces engage the floating member outer slide surfaces.

The floating member has a non-circular washer shape.

The floating member has floating member front and rear surfaces and a floating member peripheral surface which extends therebetween; and the floating member peripheral surface is devoid of depressions or protrusions.

The floating member is configured to transfer said torque only within boundaries of a single, overlapping, continuous axial area, equal in length to a floating member width.

An axial displacement is defined axially between the holder and reamer portions; and in the non-operative position, the axial displacement has a predetermined positive value; and in the operative position, the axial displacement is reduced relative to said predetermined value.

The floating member comprises floating member front and rear surfaces which are devoid of depressions or protrusions.

No shear forces are applied to the floating member in a plane perpendicular to either of the holder and reamer portion axes.

In the non-operative position, the reamer portion is accurately axially located with respect to the holder portion.

The floating member has a rectangular shape in an axial view thereof.

BRIEF DESCRIPTION OF THE DRAWINGS

For a better understanding of the subject matter of the present application and to show how the same may be carried out in practice, reference will now be made to the accompanying drawings, in which:

FIG. 1 is an isometric view of a floating reamer holder;

FIG. 2 is an isometric exploded view of the floating reamer holder of FIG. 1;

FIG. 7 is a detailed view of portion VII of FIG. 3.

Figure 3:
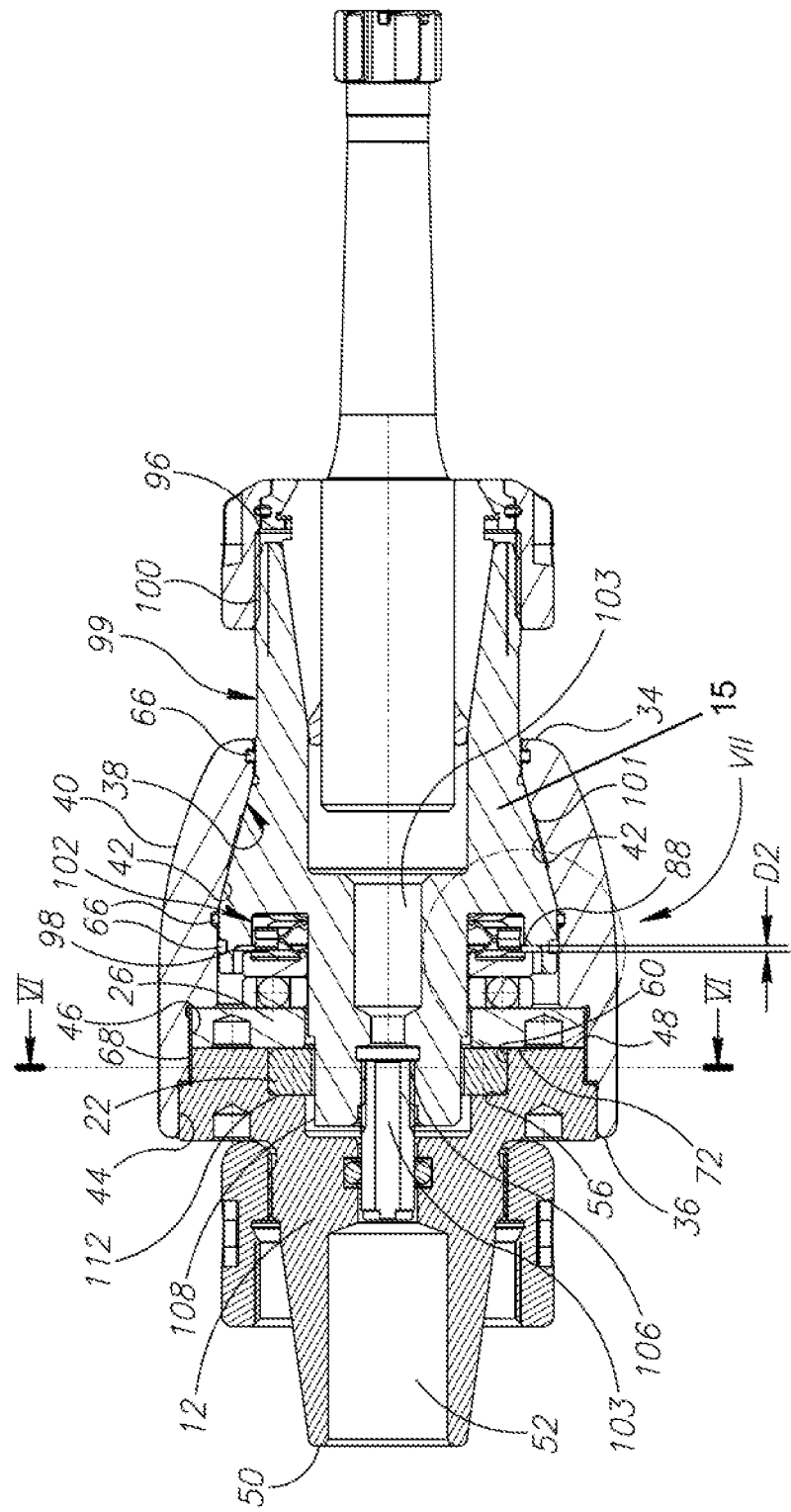
FIG. 3 is an axial cross sectional view of the floating reamer holder of FIG. 1 in a non-operative position.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIGS. 1 and 2. A compact, oldham-type floating reamer holder 10 includes elongated holder and reamer portions 12, 14 which define, respectively, a rearward RWD to forward FWD direction of the holder 10. A reamer 16 with a reamer axis R is coupled into the reamer portion 14 via, e.g., a collet 18 and a nut 20. The holder and reamer portions 12, 14 form an oldham-type coupling by transferring torque therebetween via a compact floating member 22, which has a floating member width W1. The holder and reamer portions 12, 14 are held together by a housing sleeve 24. The holder and reamer portions 12, 14 have respective central holder and reamer portion axes HP, RP.

Attention is drawn to FIGS. 1 and 3. In a non-operative position, i.e., the floating reamer holder 10 is fully assembled, and no reaming forces are applied to the reamer 16. The floating reamer holder 10 is configured to accurately center, or radially align, the reamer portion 14 relative to the holder portion 12, in order to achieve accurate repeatability. As will be further explained below, the housing sleeve 24 is rigidly and releasably coupled to the holder portion 12. In the non-operative position, the reamer portion 14 is elastically forced against the housing sleeve 24 via cooperating centering surfaces, which centers and axially locates the reamer portion 14 relative the holder portion 12.

In the following order along the holder portion axis HP, the floating reamer holder 10 can include: the holder portion 12, the floating member 22, a lid 26, a thrust bearing 28, an annular elastic element 30 and the reamer portion 14.

In an operative position (i.e., during reaming of a workpiece pre-drilled hole 32) the floating member 22 transfers torque between the holder and reamer portions 12, 14. Although the holder and reamer portions 12, 14 do not rotate with respect to one another, the floating reamer holder 10 is configured to enable up to three relative motion types between the holder and reamer portions 12, 14. The floating reamer holder 10 can simultaneously enable two, or three of the relative motion types.

In a transition between the non-operative and operative positions, the floating reamer holder 10 (specifically, the reamer portion 14) self-aligns, or automatically aligns, with respect to the pre-drilled hole 32. Once aligned, the reamer portion 14 abuts the sleeve 24 at one or more locations, according to its orientation.

Figure 4:
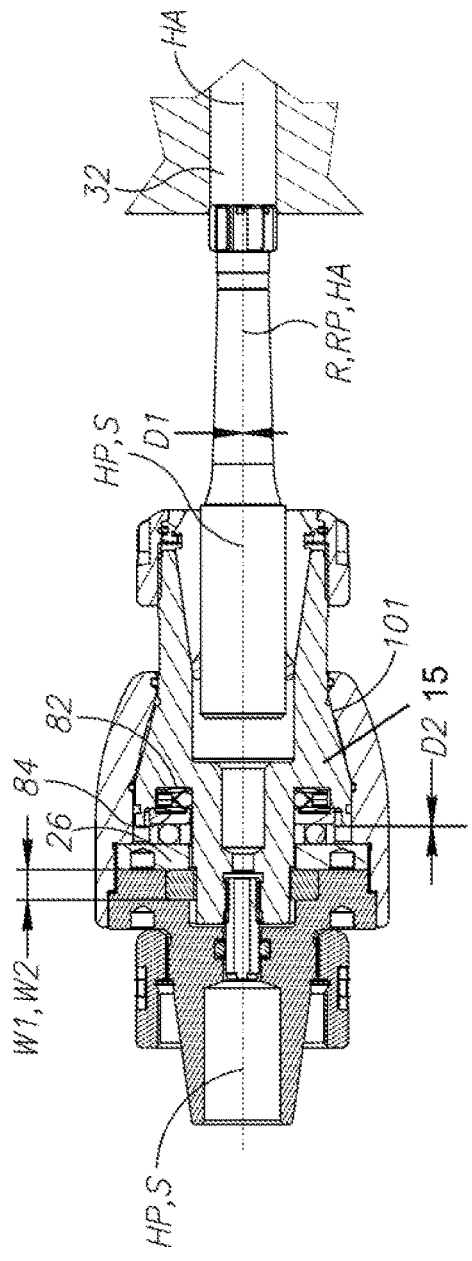
FIG. 4 is an axial cross sectional view of the floating reamer holder in a first example of an operative position during reaming of a workpiece pre-drilled hole.

Type I of relative motion is axis parallel offset (also referred to herein as "axis parallel misalignment"), i.e., the movement of the reamer portion 14 relative to the holder portion 12 in a plane perpendicular to the holder portion axis HP. The thrust bearing 28 located between the holder and reamer portions 12, 14 is configured to reduce friction with, or smoothen, this type of movement. Attention is drawn to FIG. 4, showing a parallel offset D1, defined between the parallel holder and reamer portion axes HP, RP in the operative position. The parallel offset D1 can be as large as 0.5 mm. In the present embodiment, D1 can receive values between 0 and 0.15 mm.

Type II of relative motion is axial displacement (also referred to herein as "axial translation"), i.e., movement of the reamer portion 14 relative the holder portion 12 in the axial direction. An axial displacement D2 (see FIG. 3) is defined between respective portions of the holder and reamer portions 12, 14 (as will be disclosed below). In the non-operative position, the axial displacement D2 has a predetermined maximum value, and in the operative position, the axial displacement D2 is reduced relative to the predetermined maximum value. According to the present embodiment, the axial displacement D2=0 in the operative position. The maximum value of the axial displacement D2 is determined by, e.g., various manufacturing and geometric criteria.

The axial displacement D2 decreases during the transition between the operative and non-operative positions. An advantage of the type II relative motion is that during said transition, the floating reamer holder 10 suppresses (via the elastic element 30), at least a portion of axial reaming forces. An advantage of such suppression is improvement of workpiece surface quality. Specifically, it can prevent (or at least reduce) unwanted imperfections occasionally caused during said transition at an edge, or chamfer, at the opening of the pre-drilled hole 32.

Furthermore, type II of relative motion creates enough "room" between the sleeve and reamer portion 14, which enables the other two types of relative motion between the holder and reamer portions 12, 14.

Type III of relative motion is angular misalignment. The floating reamer holder 10 enables a misalignment angle α to be formed between the holder and reamer portion axes HP, RP. According to the present embodiment, the misalignment angle α can receive values between 0 and up to 0.5 degrees.

Attention is drawn to FIG. 3. Before reaming, the floating reamer holder 10 is in the non-operative position, in which the sleeve, reamer, holder and reamer portion axes S, R, HP, RP are co-aligned. Consequently, in this position, D1 and a equal zero and D2 has a predetermined, maximum value.

Figure 5:
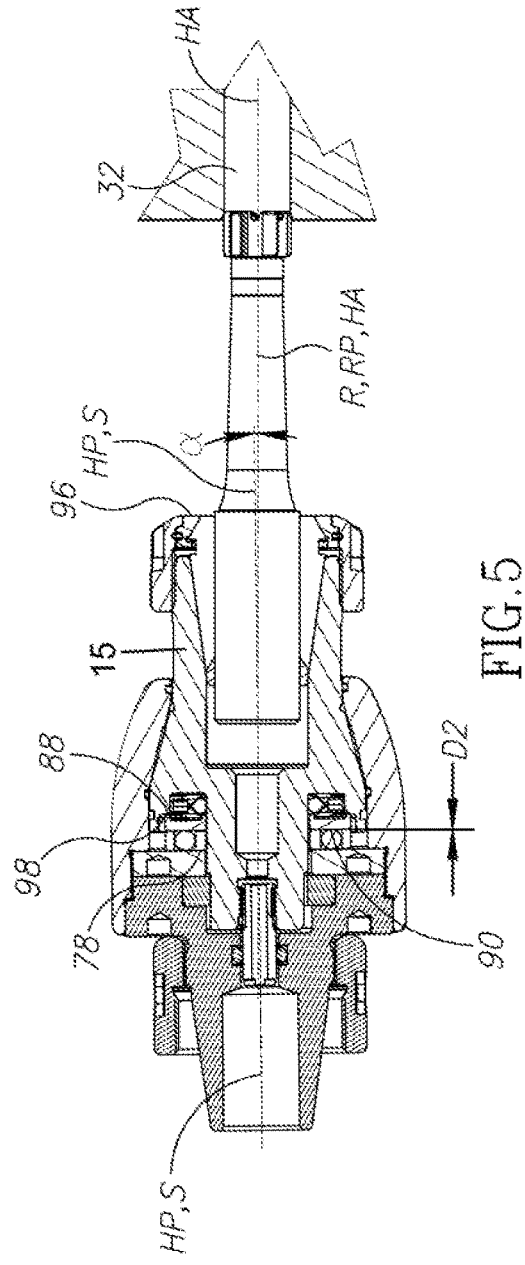
FIG. 5 is an axial cross sectional view of the floating reamer holder in a second example of an operative position during reaming of a workpiece pre-drilled hole.

Attention is drawn to FIGS. 4 and 5. Two examples of operative positions of the floating reamer holder 10 are respectively shown, where the holder portion axis HP is misaligned with respect to the hole axis HA. In other words, these are two possible orientations between the holder portion 12 and the workpiece pre-drilled hole 32 during reaming thereof. D2 equals zero in both examples, as abovementioned with regards to the operative position.

In the first example shown in FIG. 4, only types I and II of relative motion are enabled. In this example, the floating reamer holder 10 is oriented such that the reamer, reamer portion and hole axes R, RP HA are co-aligned, and form a non-zero parallel offset (D1>0) with the holder portion axis HP.

In the second example, shown in FIG. 5, types II and III of relative motion are enabled. In this example, reamer, reamer portion and hole axes R, RP HA are co-aligned, and form a non-zero misalignment angle α with the holder portion axis HP.

The housing sleeve 24 can have an elongated shape with opposite circular sleeve front and rear surfaces 34, 36 and sleeve inner and outer surfaces 38, 40 which extend therebetween. The housing sleeve 24 has a central sleeve axis S which passes through virtual centers of the sleeve front and rear surfaces 34, 36. The sleeve inner surface 38 includes a sleeve first centering surface 42 which extends rearwardly from the sleeve front surface 34. The sleeve first centering surface 42 tapers forwardly, towards the sleeve front surface 34. The sleeve first centering surface 42 can have a frusto-conical shape. The sleeve first centering surface 42 is configured to engage, and center, the reamer portion 14 relative to the housing sleeve 24. Furthermore, the sleeve first centering surface 42 is configured to axially locate the reamer portion 14 relative to the holder portion 12. In other words, the sleeve first centering surface 42 is also configured as an axial stopping surface. This is advantageous, in terms of accurate repeatability between each reaming operation or reamer 16 replacement.

The sleeve can further include a sleeve second centering surface 44 which extends forwardly from the sleeve rear surface 36. The sleeve second centering surface 44 has a cylindrical shape. The sleeve second centering surface 44 is configured to center the holder portion 12 relative to the housing sleeve 24. Thus, at least in the non-operative position, the holder and reamer portion axes HP, RP are co-aligned.

The sleeve inner surface 38 further includes a female sleeve thread 46 which is located between the sleeve first and second centering surfaces 42, 44. The sleeve thread 46 is configured to rigidly and releasably connect, or couple, the housing sleeve 24 to the holder portion 12. The sleeve thread 46 is also configured to rigidly and releasably couple the lid 26 to the housing sleeve 24. Once the housing sleeve 24 is rigidly screw-tightened to the holder portion 12, the sleeve and holder portion axes S, HP become co-aligned.

The holder portion 12 includes holder portion front and rear surfaces 48, 50 and a through holder portion duct 52 for conveying coolants. The holder portion front surface 48 extends perpendicularly to the holder portion axis HP. The holder portion front surface 48 includes a central member recess 54 which opens out thereto. The member recess 54 is configured to accommodate the floating member 22, such that the floating member 22 can only move along a single radial direction (perpendicular to the holder portion axis HP).

The member recess 54 includes a recess bottom surface 56 and a recess peripheral surface 58 which extends between the recess bottom surface 56 and the holder portion front surface 48. The recess bottom surface 56 and the holder portion front surface 48 define a member recess depth W2≥W1. The fact that the member recess 54 is as deep as, or deeper than, the floating member width W1 is advantageous, since it enables torque to be transferred only within the boundaries of a single, overlapping axial area (the floating member width W1). Therefore, no axial bending moment, or shear forces (in a plane perpendicular to the holder portion axis HP) are applied on the floating member 22 during machining. The bottom surface 56 is perpendicular to the holder portion axis HP. The holder portion duct 52 opens out to the recess bottom surface 56.

The recess peripheral surface 58 includes two opposite and parallel recess slide surfaces 60. The recess slide surfaces 60 are at least partially planar. Each recess slide surface 60 can include a relief groove at a radial mid-portion thereof to ensure separation into two abutment locations. The recess slide surfaces 60 extend parallel to the holder portion axis HP. The recess peripheral surface 58 can include two opposite recess stop surfaces 64, each located between, the two recess slide surfaces 60. According to the subject matter of the present embodiment, the recess stop surfaces 64 are parallel to one another and planar, and each extends perpendicular to the two recess slide surfaces 60.

The recess peripheral surface 58 is configured to form enough room, or spaces between the floating member 22 and one, or each, of the recess stop surfaces 64. The parallel recess slide surfaces 60 are perpendicular to the floating member's inner slide surfaces 118 and parallel to the floating member's outer slide surfaces 116. The floating member 22 is configured to fit tightly between the recess slide surfaces 60, while free to move, or slide, back and forth only in a radial direction parallel to the recess slide surfaces 60 and perpendicular to the holder portion axis HP. Further to providing accurate directional movement, the tight fit advantageously prevents the floating member 22 from rotating within the member recess 54, which can lead to unwanted wear and torque loss. The member recess 54 can be lubricated to enable smooth motion of the floating member 22. Lubricants are isolated from any coolant (which can be pumped via the cooling ducts) via sealing rings 66.

The holder portion 12 further includes a male holder portion thread 68 which is located adjacent the holder portion front surface 48 and extends rearwardly. The male holder portion thread 68 is configured to engage the sleeve thread 46.

The lid 26 has a washer shape. The lid 26 has opposite and parallel lid front and rear surfaces 70, 72 and an external male lid thread 74 which extends therebetween. The lid 26 further includes a lid hole 75 which opens out to the lid front and rear surfaces 70, 72. The lid thread 74 is configured to engage the sleeve thread 46. The lid 26 is screwed into the sleeve thread 46, followed by the holder portion thread 68 of the holder portion 12. In this position, the lid rear surface 72 can abut the holder portion front surface 48. The lid 26 allows for a convenient separation between the holder and reamer portions 12, 14. For example, the floating reamer holder 10 allows replacing the holder portion 12, while the lid 26 prevents the thrust bearing 28, the elastic element 30 and the reamer portion 14 from falling out of the sleeve rear surface 36.

The thrust bearing 28 has a washer shape, and includes bearing front and rear surfaces 76, 78. After the floating member holder 10 has been assembled, and the lid 26 has been screw tightened in the sleeve thread 46, the bearing rear surface 78 abuts the lid front surface 70 and the bearing front surface 76 abuts the elastic element 30.

According to the subject matter of the present embodiment, the elastic element 30 can include an annular-shaped wave spring 80 with a corresponding annular-shaped base 86. The wave spring is known for being shorter that a coiled spring with a similar spring coefficient, thus contributing to the general shortness of the floating member holder 10. Another advantage of the wave spring is better symmetry about its central axis, compared to a coiled spring. The wave spring 80 has spring front and rear surfaces 82, 84. The wave spring 80 is concentric with the reamer portion 14. The base 86 has base front and rear surfaces 88, 90 and a base peripheral surface 92 which extends therebetween. The base front surface 88 can have a concentric, annular base recess 94 which opens out thereto and a non-recessed peripheral portion 97 surrounding the base recess 94. The wave spring 80 is configured to tightly fit within the base recess 94, which prevents the wave spring 80 from unwanted radial movement under load from the reamer portion 14. The wave spring 80 is enclosed between the base recess 94 and a corresponding recess in the reamer portion 14, as will be further disclosed below.

An advantage of the annular wave spring 80 over some in-line coiled springs (used in some arrangements in the field) is that it can save room in the axial direction, i.e., it doesn't take up axial space between the holder and reamer portions 12, 14.

Once the lid 26 has been screw tightened in the sleeve thread 46, in the axial direction, the elastic element 30 abuts the thrust bearing 28 at the base rear surface 90. In the non-operative position, the wave spring 80 abuts the reamer portion 14, forcing it forwardly. In this position, the non-recessed peripheral portion 97 of the base front surface 88 does not axially contact the reamer portion 14, forming an annular gap therebetween, which defines the axial displacement D2.

In the operative position, axial cutting forces push the reamer portion 14 rearwardly, which compresses the wave spring 80 and closes the gap. Consequently, the reamer portion 14 axially abuts the non-recessed peripheral portion 97 of the base front surface 88. In this position, in the present embodiment, the axial displacement is reduced such that D2 equals zero.

The elastic element 30 constantly biases the reamer portion 14 forwardly, which ensures that in the non-operative position, it is accurately radially centered, and axially located, with respect to the housing sleeve 24 (and consequently—the holder portion 12).

The reamer portion 14 includes axially opposite reamer portion front and rear surfaces 96, 98 and an external reamer portion peripheral surface 99 which extends therebetween. The reamer portion peripheral surface 99 includes a reamer portion centering surface 101 located adjacent the reamer portion rear surface 98. The reamer portion centering surface 101 tapers in the forward direction towards the reamer portion front surface 98. The reamer portion centering surface 101 can have a frustoconical shape. The reamer portion 14 includes the collet 18 and nut 20 reamer coupling arrangement adjacent the reamer portion front surface 96. The reamer portion 14 can include a collet receiving surface which opens out to the reamer portion front surface 96, and an external male reamer portion thread 100 configured to cooperate with a female thread of the nut 20.

The reamer portion 14 further includes only a single, central protrusion 104 which extends rearwardly from the reamer portion rear surface 98 and has a protrusion end surface 106. As seen in FIGS. 3-5, the reamer portion 14 is configured such that all parts of the reamer portion 14 always rotate together. The reamer portion 14 may include a reamer portion body 15 having unitary one-piece construction and axially extending from the protrusion end surface 106 to the reamer portion front surface 96.

The reamer portion 14 has an annular reamer portion recess 102 which opens out to the reamer portion rear surface 98, and surrounds the protrusion 104. The reamer portion recess 102 is configured to accommodate the wave spring 80 and abut the wave spring front surface 82.

At least in the non-operative position, the protrusion 104 is located within, or passes through, the elastic element 30, the thrust bearing 28, the lid hole 75, the floating member 22 and the member recess 54. This axial overlapping of the holder and reamer portions 12, 14 is advantageous, since it leads to a shorter, more compact floating reamer holder 10. At the same time, this adds stability during machining. The reamer portion 14 includes an internal, through reamer portion duct 103 which opens out to the reamer portion front surface 96 and the protrusion end surface 106. This is also advantageous, since it makes it easier to isolate the coolant from lubricants.

The protrusion 104 includes two opposite and parallel protrusion slide surfaces 108 which are located adjacent the protrusion end surface 106. According to the present example, the protrusion slide surfaces 108 extend forwardly from the protrusion end surface 106. The protrusion slide surfaces 108 extend parallel to the reamer portion axis RP.

The floating member 22 has a washer shape, in this instance a non-circular washer shape. The floating member 22 includes floating member front and rear surfaces 110, 112 and a floating member peripheral surface 114 which extends therebetween. The floating member peripheral surface 114 is devoid of depressions or protrusions. The floating member front and rear surfaces 110, 112 define the floating member width W1, and a width direction therebetween. The floating member front and rear surfaces 110, 112 are devoid of any protrusions. The floating member front and rear surfaces 110, 112 can have a rectangular shape. The floating member peripheral surface 114 includes two opposite, planar and parallel member outer slide surfaces 116.

The floating member 22 includes a central, through floating member hole 120 which opens out to the member front and rear surfaces 110, 112. The floating member hole 120 includes opposite, planar and parallel member inner slide surfaces 118. The member inner slide surfaces 118 are perpendicular to the member outer slide surfaces 116. The member inner slide surfaces 118 are configured to engage the protrusion slide surfaces 108 and transfer torque therebetween. Each member inner slide surface 118 can include a relief groove 62 at a radial mid-portion thereof to ensure separation into two abutment locations.

Figure 6:
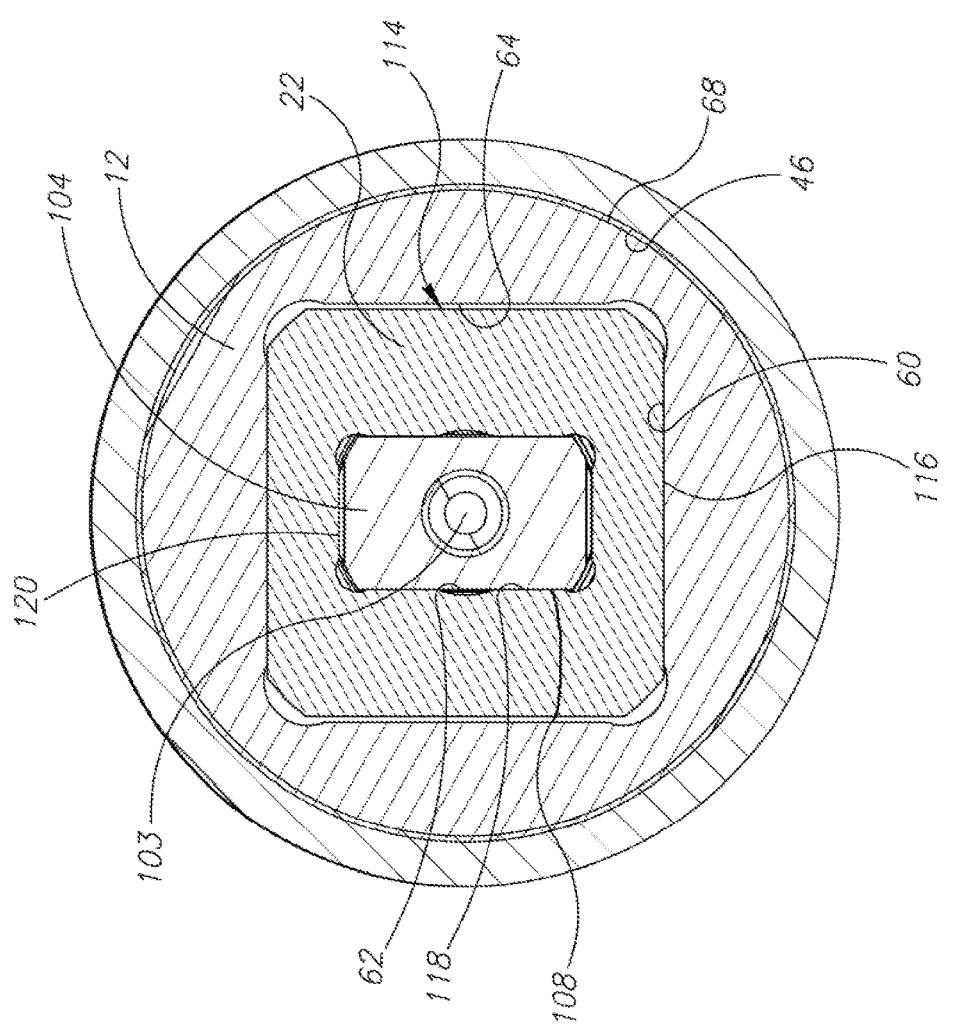
FIG. 6 is a cross sectional view taken along line IV-IV of FIG. 3.

As seen from FIGS. 3 and 6, the floating member 22 is configured to transfer a torque directly (i.e., without any intervening element), from the holder portion 12 to the reamer portion 14. The protrusion 104 of the reamer portion 14 tightly fits within the floating member hole 120. The floating member hole 120 is configured to enable smooth and accurate movement of the floating member 22 only along a single radial direction relative to the reamer portion 14 (perpendicular to the reamer portion axis RP). In other words, the protrusion slide surfaces 108 form a sliding fit with the member inner slide surfaces 118, allowing the said accurate relative movement between the floating member 22 and the protrusion 104. Furthermore, this tight or sliding fit prevents relative rotation between the protrusion 104 and the floating member 22. The tight-fit enclosure of the floating member 22 within the member recess 54, and the tight-fit enclosure of the protrusion 104 within the floating member hole 120 provides a reliable and robust (while being compact) oldham-type coupling, which can withstand large machining forces. Put differently, the floating member 22 is secured, and abutted, radially inside and outside, which helps spread the torque loads.

Once the floating member holder 10 has been assembled, and is in a non-operative position, the floating member rear surface 112 abuts the recess bottom surface 56. The member outer slide surfaces 116 abut the recess slide surfaces 60. The member inner slide surfaces 118 abut the protrusion slide surfaces 108. The floating member front surface 110 abuts the lid rear surface 72. The lid front surface 70 abuts the bearing rear surface 78. The bearing front surface 76 abuts the base rear surface 90. The non-recessed peripheral portion 97 of the base front surface 88 does not abut any surface. The wave spring rear surface 84 abuts the base recess 94. The wave spring front surface 82 abuts an inner surface (not shown) of the reamer portion recess 102. And the reamer portion centering surface 101 abuts the sleeve first centering surface 42.

In the operative position, the abovementioned engagement relations remain the same, with the exception of the non-recessed peripheral portion 97 of the base front surface 88, which abuts the reamer portion rear surface 98. In the operative position, the reamer portion centering surface 101 may still abut the sleeve first centering surface 42, depending on the orientation of the holder portion 12 relative the pre-drilled hole 32.

Another advantage of the floating reamer holder 10 related to stability (minimum bending moment, and throw) and compactness, is that all the torque is transferred (only) over a single, overlapping axial space defined as the floating member width W1. In other words, in an operative position, torque is continuously transferred from the holder portion 12 to the floating member 22 and from the floating member 22 to the reamer portion 14 only within boundaries of a continuous, well-defined axial area. This is achieved thanks to the abovementioned, inner-outer abutment between the floating member 22 and the holder and reamer portions 12, 14.

Yet another advantage of the floating member 22 is its geometric simplicity, which translates into lowering production costs, while preserving the robustness of the floating reamer holder 10. The floating reamer holder 10 was tested and performed well at high cutting speeds of Vc=100-200 m/min.

What is claimed is:

1. A compact oldham-type floating reamer holder (10) having forward (FWD) and rear (RWD) directions and comprising:
   a holder portion (12) having a central holder portion axis (HP);
   a reamer portion (14) having a reamer portion axis (RP) and axially opposite reamer portion front and rear surfaces (96, 98), the reamer portion (14) being configured such that all parts of the reamer portion always rotate together and further being configured to retain a reamer (16);
   a floating member (22) configured to transfer a torque directly from the holder portion (12) to the reamer portion (14); and
   an annular elastic element (30) at least partially overlapping the reamer portion (14) in the axial direction and biasing the reamer portion (14) in the axially forward direction (FWD),
   wherein
   in an operative position, the floating reamer holder (10) is configured to accommodate an angular misalignment, a parallel misalignment and an axial translation between the holder and reamer portion axes (HP, RP); and
   in a non-operative position, the reamer portion axis (RP) is accurately co-aligned with the holder portion axis (HP).

2. The floating reamer holder (10) according to claim 1, wherein
   the floating reamer holder (10) comprises a housing sleeve (24) rigidly and releasably connected to the holder portion (12), and
   the reamer portion (14) and the housing sleeve (24) have respective, cooperating sleeve first centering surface and reamer portion centering surface (42, 101) which taper in the axially forward direction (FWD).

3. The floating reamer holder (10) according to claim 2, wherein the sleeve first centering surface (42) and the reamer portion centering surface (101) both have a frusto-conical shape.

4. The floating reamer holder (10) according to claim 2, wherein:
   a lid (26) is provided at a rear end of the housing sleeve (24);
   a thrust bearing (28) is positioned in the housing sleeve (24) forward of the lid (26);
   the annular elastic element (30) comprises an annular-shaped wave spring (80) provided with a base (86) to prevent the wave spring (80) from unwanted radial movement; and
   the wave spring (80) is located forward of the thrust bearing (28).

5. The floating reamer holder (10) according to claim 1, wherein
the holder portion (12) has a member recess (54); and
the floating member (22) is entirely located within the member recess (54).

6. The floating reamer holder (10) according to claim 1, wherein the reamer portion (14) has a single central protrusion (104) which at least partially axially overlaps the holder portion (12) from within.

7. The floating reamer holder (10) according to claim 6, wherein the protrusion (104) is located within a through floating member hole (120).

8. The floating reamer holder (10) according to claim 6, wherein
the floating member (22) has floating member inner slide surfaces (118); and
the protrusion (104) comprises opposite and parallel protrusion slide surfaces (108) which engage the floating member inner slide surfaces (118).

9. The floating reamer holder (10) according to claim 8, wherein
the floating member (22) has floating member outer slide surfaces (116);
the holder portion (12) has a member recess (54) provided with opposite and parallel recess slide surfaces (60), the recess slide surfaces (60) being perpendicular to the floating member inner slide surfaces (118) and parallel to the floating member outer slide surfaces (116); and
the holder portion's recess slide surfaces (60) engage the floating member outer slide surfaces (116).

10. The floating reamer holder (10) according to claim 1, wherein the floating member (22) has a non-circular washer shape.

11. The floating reamer holder (10) according to claim 1, wherein
the floating member (22) has floating member front and rear surfaces (110, 112) and a floating member peripheral surface (114) which extends therebetween; and
the floating member peripheral surface (114) is devoid of depressions or protrusions.

12. The floating reamer holder (10) according to claim 1, wherein the floating member is configured to transfer said torque directly to said reamer portion, only within boundaries of a single, continuous axial area of overlap between the floating member and the reamer portion, equal in length to a floating member width (W1).

13. The floating reamer holder (10) according to claim 1, wherein
an axial displacement (D2) is defined axially between the holder and reamer portions (12, 14); and
in the non-operative position, the axial displacement (D2) has a predetermined positive value; and
in the operative position, the axial displacement is reduced relative to said predetermined positive value.

14. The floating reamer holder (10) according to claim 1, wherein the floating member (22) comprises floating member front and rear surfaces (110, 112) which are devoid of depressions or protrusions.

15. The floating reamer holder (10) according to claim 1, wherein no shear forces are applied to the floating member (22) in a plane perpendicular to either of the holder and reamer portion axes (HP, RP).

16. The floating reamer holder (10) according to claim 1, wherein in the non-operative position, the reamer portion (14) is accurately axially located with respect to the holder portion (12).

17. The floating reamer holder (10) according to claim 1, wherein the floating member (22) has a rectangular shape in an axial view thereof.

18. The floating reamer holder (10) according to claim 1, wherein:
the reamer portion (14) further comprises a protrusion (104) extending rearwardly from the reamer portion rear surface (98) to a protrusion end surface (106); and
the reamer portion (14) includes a reamer portion body (15) having unitary one-piece construction and axially extending from the protrusion end surface (106) to the reamer portion front surface (96).

19. A compact self-centering floating reamer holder (10) having forward (FWD) and rear (RWD) directions and comprising:
an elongated holder portion (12) having a central holder portion axis (HP);
an elongated reamer portion (14) located forward of the holder portion and having a reamer portion axis (RP), the reamer portion configured to retain a reamer and comprising:
axially opposite reamer portion front and rear surfaces (96, 98); and
an external reamer portion centering surface (101) which tapers towards the reamer portion front surface (96), in the forward direction (FWD); wherein
the reamer portion is configured such that all parts of the reamer portion always rotate together,
a housing sleeve (24) rigidly and releasably connected to the holder portion (12), the housing sleeve having a tapering sleeve first centering surface (42);
an annular elastic element (30) axially forcing the reamer portion centering surface (101) against the tapering sleeve first centering surface (42), in the forward direction (FWD); and
a floating member (22) located within the housing sleeve and configured to transfer a torque directly from the holder portion (12) to the reamer portion (14).

20. The floating reamer holder (10) according to claim 19, wherein the floating member is configured to transfer said torque directly to said reamer portion, only within boundaries of a single, continuous axial area of overlap between the floating member and the reamer portion, equal in length to a floating member width (W1).

21. The floating reamer holder (10) according to claim 19, wherein:
the reamer portion (14) further comprises a protrusion (104) extending rearwardly from the reamer portion rear surface (98) to a protrusion end surface (106); and
the reamer portion (14) includes a reamer portion body (15) having unitary one-piece construction and axially extending from the protrusion end surface (106) to the reamer portion front surface (96).

* * * * *